C. W. McKINLEY.
SPRING SHACKLE MOUNTING.
APPLICATION FILED DEC. 1, 1914.
1,151,028.
Patented Aug. 24, 1915.
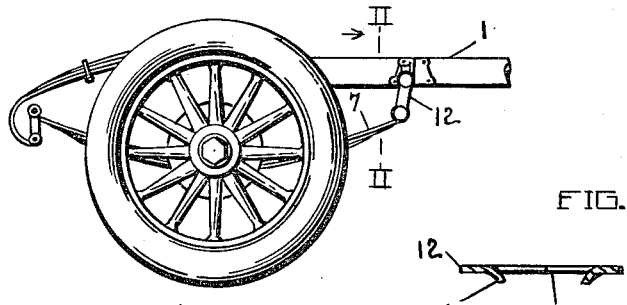
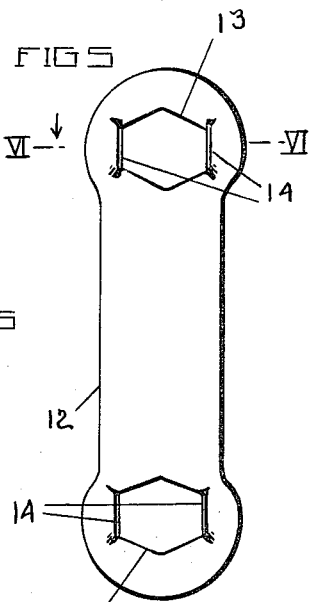
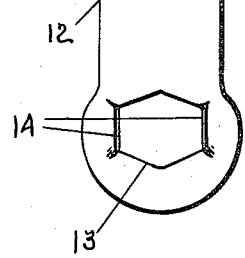
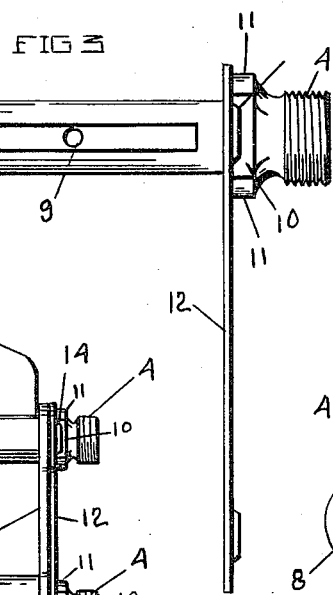
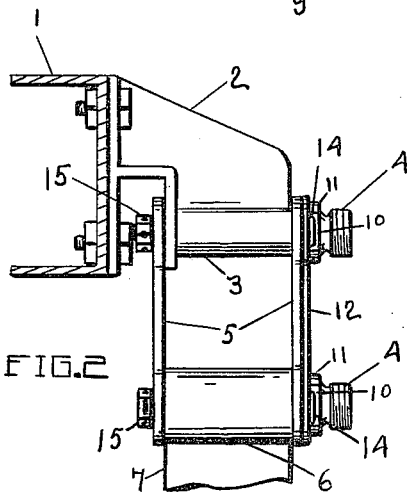
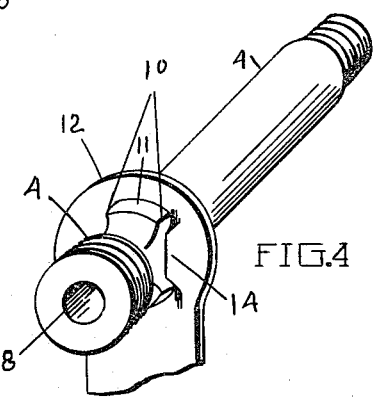

UNITED STATES PATENT OFFICE.

CHARLES W. McKINLEY, OF TOLEDO, OHIO, ASSIGNOR TO THE WILLYS-OVERLAND COMPANY, OF TOLEDO, OHIO, A CORPORATION OF OHIO.

SPRING-SHACKLE MOUNTING.

1,151,028.  Specification of Letters Patent.  Patented Aug. 24, 1915.

Application filed December 1, 1914. Serial No. 875,043.

*To all whom it may concern:*

Be it known that I, CHARLES W. McKINLEY, a citizen of the United States, residing at Toledo, Lucas county, Ohio, have invented new and useful Spring-Shackle Mountings, of which the following is a specification.

This invention relates to mountings, and more particularly to supplementary linkage mountings between two pins.

This invention has utility when embodied in linkage mountings for leaf springs, especially the shackles for motor vehicle springs Referring to the drawings: Figure 1 is a fragmentary side elevation of an embodiment of the invention in the shackle for the rear spring of a motor vehicle; Fig. 2 is a section on an enlarged scale on the line II—II, Fig. 1, looking in the direction of the arrow; Fig. 3 is a side elevation of one of the pins and the holding plate; Fig. 4 is a perspective view of one of the pins and a fragment of the plate; Fig. 5 is a side elevation of the plate from the right in Fig. 3; and Fig. 6 is a section on the line VI—VI, Fig. 5.

The motor vehicle frame 1 has mounted thereon the bracket 2 terminating in an overhanging sleeve portion 3 through which extends the pin 4 carrying on each side of said sleeve portion an element 5 of the load carrying link. The free ends of said elements 5 coact with a second pin 4 which has mounted thereon between the elements 5 the terminal sleeve 6 of the leaf spring 7. Central opening 8 in the pin 4 supplies lubricant through the passage 9 to the central sleeve portion of the pin, to which portion of the pin the link swing action or relative movement is confined.

The pin 4 has on opposite sides thereof the parallel plane or flat faces 10 at the pin collar 11. The holding plate 12 is provided with polygonal pin embracing openings 13, with such close clearance that the plate may be slipped into position on the pin with but little play. Parallel opposing sides of the polygonal openings 13 have struck out portions or projecting cheeks 14 snugly contacting for long bearing the faces 10 of the pins 4. The short bearings of the link elements 5 are held against rotation relatively to the pins 4 by the plate 12 extending to embrace each pin 4. The cheeks 14 preclude rotation of the pin relatively to plate, and the extension of the plate to the other pin 4 holds the plate from rotation with either pin independently of the other. The collar 11 holds the plate in position as to the pin, while the nut 15 maintains the pin assembled in the shackle mounting for the spring. The plate 12 is of light weight, of simple form to produce, may be easily and readily applied, in no way detracts from the strength of the structure, introduces no deterioration inviting features, is sightly, and has maximum strength in the direction of possible strain in resisting relative rotation between the pins 4.

The great load with constant subjection to short swing movements, in the shackle herein is positively confined to the long bearing portions or intermediate sleeved sections of the pins, insuring a maximum of life for the shackle.

What is claimed and it is desired to secure by Letters Patent is:

1. A spring carrier link, mountings therefor embodying a bracket, a pin connecting the link to the bracket, a spring, a pin connecting the link to the spring, and means in addition to the link for confining the relative pin movement to the bracket and spring, comprising a plate coacting with each pin and means for holding the plate in position.

2. A spring carrier link, mounting pins therefor, and means for holding the pins against movement relatively to the link, comprising in addition to the link a key plate disposed to coact with a pair of pins.

3. A motor vehicle spring shackle embodying a link, a pair of pins for mounting the link, and means for holding the pins against movement relatively to the link, comprising in addition to the link a sheet metal plate having projecting cheeks coacting with the pins to hold the pins from rotation as to the link.

4. A spring shackle pin provided with a pair of parallel faces, a pair of members with which the pin coacts, and a polygonal opening holding plate for the pin as to one of the members, said plate having projecting cheeks coacting with the parallel faces of the pin.

5. A spring shackle pin having a plane face, a pair of members with which the pin coacts, and a sheet metal holding plate for the pin as to one of the members, said plate having a polygonal opening for the pin and a projecting cheek coacting with the plane face of the pin to hold the pin from relative rotation.

6. A pair of parallel shackle pins, a load carrying link between the pins and mounted thereon, and in addition to the link a pin engaging plate extending to hold the pins from relative rotation.

7. A pair of parallel shackle pins, load carrying links between the pins loosely engaging the pins, means in addition to the link connecting the pins including a plate having projecting pin engaging cheeks coacting with the pins to hold the pins from relative rotation.

In testimony whereof I affix my signature in the presence of two witnesses.

CHARLES W. McKINLEY.

Witnesses:
C. H. RAUCH,
GEO. E. KIRK.

Copies of this patent may be obtained for five cents each, by addressing the "Commissioner of Patents, Washington, D. C."